(12) United States Patent
Karadeniz et al.

(10) Patent No.: US 12,135,909 B1
(45) Date of Patent: Nov. 5, 2024

(54) SYNCHRONIZATION OF DISPARITY CAMERA

(71) Applicant: Meta Platforms Technologies, Inc., Menlo Park, CA (US)

(72) Inventors: Turhan Karadeniz, Oakland, CA (US); Tamer Elazhary, Redmond, WA (US); Dong Zhang, Coquitlam, CA (US); John Jacob Nelson, Redmond, WA (US); Yujia Huang, Kirkland, WA (US); Cameron Maehara Lee, Fall City, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 205 days.

(21) Appl. No.: 18/045,416

(22) Filed: Oct. 10, 2022

(51) Int. Cl.
| | |
|---|---|
| *G06F 3/14* | (2006.01) |
| *G06V 10/74* | (2022.01) |
| *H04N 23/60* | (2023.01) |
| *H04N 23/63* | (2023.01) |
| *H04N 23/73* | (2023.01) |

(52) U.S. Cl.
CPC ........... *G06F 3/14* (2013.01); *G06V 10/761* (2022.01); *H04N 23/60* (2023.01); *H04N 23/63* (2023.01); *H04N 23/73* (2023.01)

(58) Field of Classification Search
CPC ........ G06F 3/14; G06V 10/761; H04N 23/63; H04N 23/73; H04N 23/60; H04N 23/74; H04N 23/745; H04N 13/341; H04N 13/398; H04N 2213/008; G09G 3/2014; G09G 3/32; G09G 5/10; G09G 5/12; G09G 5/006; G09G 2320/0247; G09G 2320/0626; G09G 2340/0435; G09G 2360/145

USPC ...................................................... 348/333.01
See application file for complete search history.

(56) References Cited

U.S. PATENT DOCUMENTS

| | | | |
|---|---|---|---|
| 10,714,055 B1 * | 7/2020 | Strasdat ................ | G06F 3/0346 |
| 10,901,225 B1 * | 1/2021 | De Nardi ............ | G02B 27/0093 |
| 10,990,816 B1 * | 4/2021 | Fix .......................... | G06T 7/246 |
| 11,310,436 B2 * | 4/2022 | Hochman ................ | H04N 5/06 |
| 11,328,655 B2 * | 5/2022 | Sugiyama ................ | G09G 3/30 |
| 11,445,123 B2 * | 9/2022 | Deighton ................ | G09G 5/10 |
| 11,619,814 B1 * | 4/2023 | Newcombe ............... | G06T 7/70 |
| | | | 345/156 |

(Continued)

FOREIGN PATENT DOCUMENTS

JP         2006311029 A        11/2006

OTHER PUBLICATIONS

European Search Report for European Patent Application No. 23195187.2, dated Feb. 1, 2024, 12 pages.

*Primary Examiner* — Pritham D Prabhakher
(74) *Attorney, Agent, or Firm* — Greenberg Traurig, LLP (57) ABSTRACT

The disclosed computer-implemented method may include synchronizing a timing scheme between a display and a camera. The method may also include triggering, using a display trigger based on the timing scheme, the display to display a content frame, and triggering, using a capture trigger based on the timing scheme, the camera to capture the displayed content frame. The method may further include building a timeline of frame events for the displayed content frame and the captured content frame, and matching, using the timeline of frame events, the displayed content frame with the captured content frame. Various other methods, systems, and computer-readable media are also disclosed.

20 Claims, 7 Drawing Sheets

(56) References Cited

U.S. PATENT DOCUMENTS

| | | | |
|---|---|---|---|
| 11,715,331 B1* | 8/2023 | Fix | G06V 10/141 |
| | | | 348/78 |
| 11,722,777 B2* | 8/2023 | Deighton | G09G 3/2014 |
| | | | 348/207.99 |
| 2013/0155210 A1 | 6/2013 | Ma | |
| 2021/0306586 A1* | 9/2021 | Yamamoto | H04N 23/73 |
| 2022/0060612 A1 | 2/2022 | Hochman et al. | |
| 2022/0103738 A1 | 3/2022 | Deighton | |
| 2022/0375387 A1* | 11/2022 | Deighton | G09G 3/32 |
| 2024/0112376 A1* | 4/2024 | Ren | G06T 11/001 |

* cited by examiner

SYNCHRONIZATION OF DISPARITY CAMERA

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Artificial reality devices often take on a wearable form factor with near-eye optics in order to place displays near a user's eyes. For example, the user may wear glasses or other head-mounted apparatus that places a display, such as a waveguide display, near the user's eyes. The displays may be placed at a desired orientation with respect to the user's eyes in order to correctly display content to the user. However, due to various factors such as the user's head size, body movement of the user, tipping, tilting, etc., the displays may become misaligned from the desired orientation. Such misalignment may cause distortion, changes in color, lighting and/or other visual defects as viewed by the user.

Some artificial reality devices may provide for corrections to the aforementioned visual defects. For example, a camera (e.g., a disparity camera) may capture the displayed content, to identify visual defects, and modify the content to counter the visual defects. However, providing such corrections may require coordination between the display and the camera.

The present disclosure is generally directed to synchronization of a disparity camera. As will be explained in greater detail below, embodiments of the present disclosure may synchronize a timing scheme between a display and a camera, and trigger the display of content and capture of the displayed content. The embodiments of the present disclosure further provides for building a timeline of row events and matching, using the timeline of row events, the displayed row with the captured row. The systems and methods described herein advantageously provide for improved coordination between a disparity camera and a display, allowing for synchronization between displaying portions of a frame of content and capturing the displayed portions. The systems and methods described herein further improve the functioning of a computer itself by improving a timing of data acquisition (e.g., various image capture events) and further improves the technical field of near-eye optics and waveguide displays.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-5, detailed descriptions of synchronizing a disparity camera with a display. Detailed descriptions of an example method for synchronizing a disparity camera will be provided in connection with FIG. 1. Detailed descriptions of an example system for disparity camera synchronization will be provided in connection with FIG. 2. Detailed descriptions of a system with a disparity camera and a display will be provided in connection with FIG. 3. Detailed descriptions of frame row timings will be provided in connection with FIG. 4. Detailed descriptions of synchronization timings will be provided in connection with FIG. 5.

Figure 1:
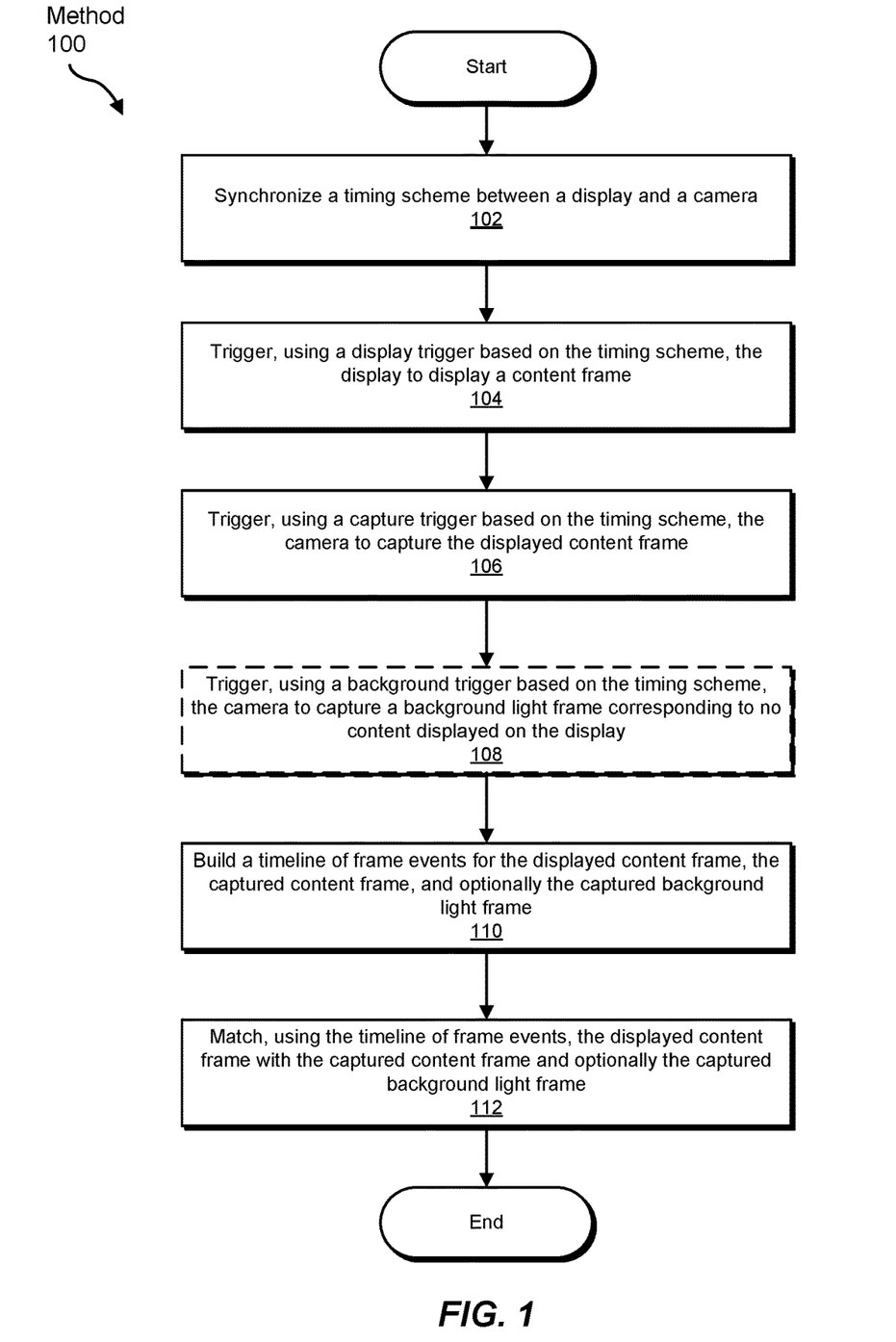
FIG. 1 is a flow diagram of an exemplary method for synchronizing a disparity camera.

FIG. 1 is a flow diagram of an exemplary computer-implemented method 100 for synchronizing a disparity camera with a display. The steps shown in FIG. 1 may be performed by any suitable computer-executable code and/or computing system, including the system(s) illustrated in FIGS. 2, 3, 6, and/or 7. In one example, each of the steps shown in FIG. 1 may represent an algorithm whose structure includes and/or is represented by multiple sub-steps, examples of which will be provided in greater detail below.

As illustrated in FIG. 1, at step 102 one or more of the systems described herein may synchronize a timing scheme between a display and a camera. For example, a synchronization module 204 in FIG. 2 may synchronize a timing scheme between a display 222 and a camera 224.

Figure 2:
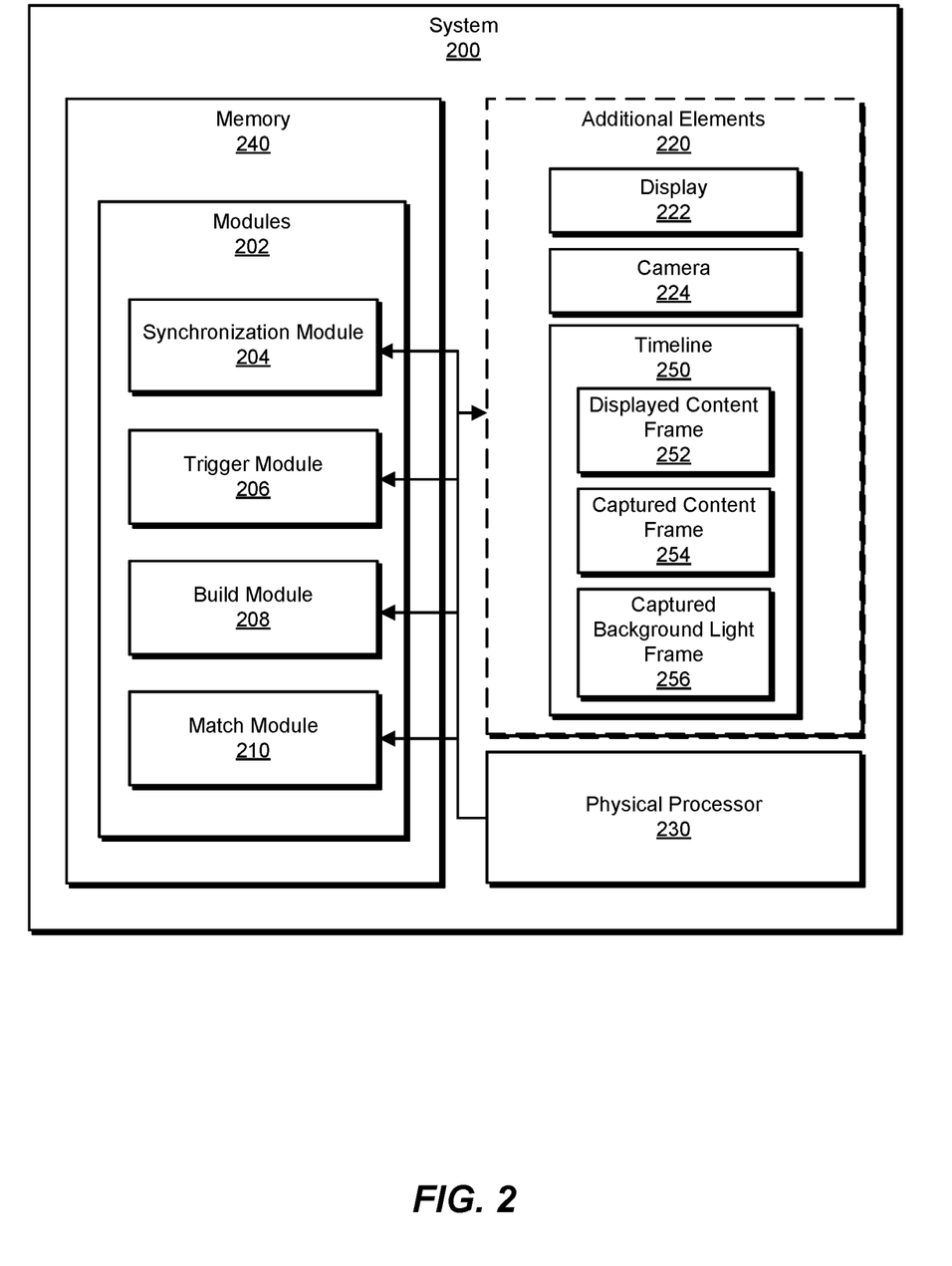
FIG. 2 is a block diagram of an exemplary system for synchronizing a disparity camera.

Various systems described herein may perform step 102. FIG. 2 is a block diagram of an example system 200 for synchronizing a disparity camera with a display. As illustrated in this figure, example system 200 may include one or more modules 202 for performing one or more tasks. As will be explained in greater detail herein, modules 202 may include a synchronization module 204, a trigger module 206, a build module 208, and a match module 210. Although illustrated as separate elements, one or more of modules 202 in FIG. 2 may represent portions of a single module or application.

In certain embodiments, one or more of modules 202 in FIG. 2 may represent one or more software applications or programs that, when executed by a computing device, may cause the computing device to perform one or more tasks. For example, and as will be described in greater detail below, one or more of modules 202 may represent modules stored and configured to run on one or more computing devices, such as the devices illustrated in FIGS. 3, 6, and/or 7. One or more of modules 202 in FIG. 2 may also represent all or portions of one or more special-purpose computers configured to perform one or more tasks.

As illustrated in FIG. 2, example system 200 may also include one or more memory devices, such as memory 240. Memory 240 generally represents any type or form of volatile or non-volatile storage device or medium capable of storing data and/or computer-readable instructions. In one example, memory 240 may store, load, and/or maintain one or more of modules 202. Examples of memory 240 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 2, example system 200 may also include one or more physical processors, such as physical processor 230. Physical processor 230 generally represents any type or form of hardware-implemented processing unit capable of interpreting and/or executing computer-readable instructions. In one example, physical processor 230 may access and/or modify one or more of modules 202 stored in memory 240. Additionally or alternatively, physical processor 230 may execute one or more of modules 202 to facilitate maintain the mapping system. Examples of physical processor 230 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 2, example system 200 may also include one or more additional elements 220, such as display 222, camera 224, and/or a timeline 250 that may be stored on a local storage device, such as memory 240, or may be accessed remotely. Display 222 may represent a display such as a waveguide, rolling display, and/or other near-eye optic, as will be explained further below. Camera 224 may represent an image sensor such as a video camera, a rolling shutter camera, a global shutter camera, etc. Timeline 250 may represent a timeline of row events and may include a displayed content frame 252, a captured content frame 254, and/or a captured background light frame 256, as will be explained further below.

Example system 200 in FIG. 2 may be implemented in a variety of ways. For example, all or a portion of example system 200 may represent portions of a system 300 in FIG. 3, a system 600 in FIG. 6, and/or a system 700 in FIG. 7, as will be explained further below.

Returning to FIG. 1, the systems described herein may perform step 102 in a variety of ways. In one example, the timing scheme may correspond to a time synchronization protocol such as precision time protocol (PTP). The timing scheme may be implemented with a time synchronizer (TS) module, such as TS 304 in FIG. 3.

Figure 3:
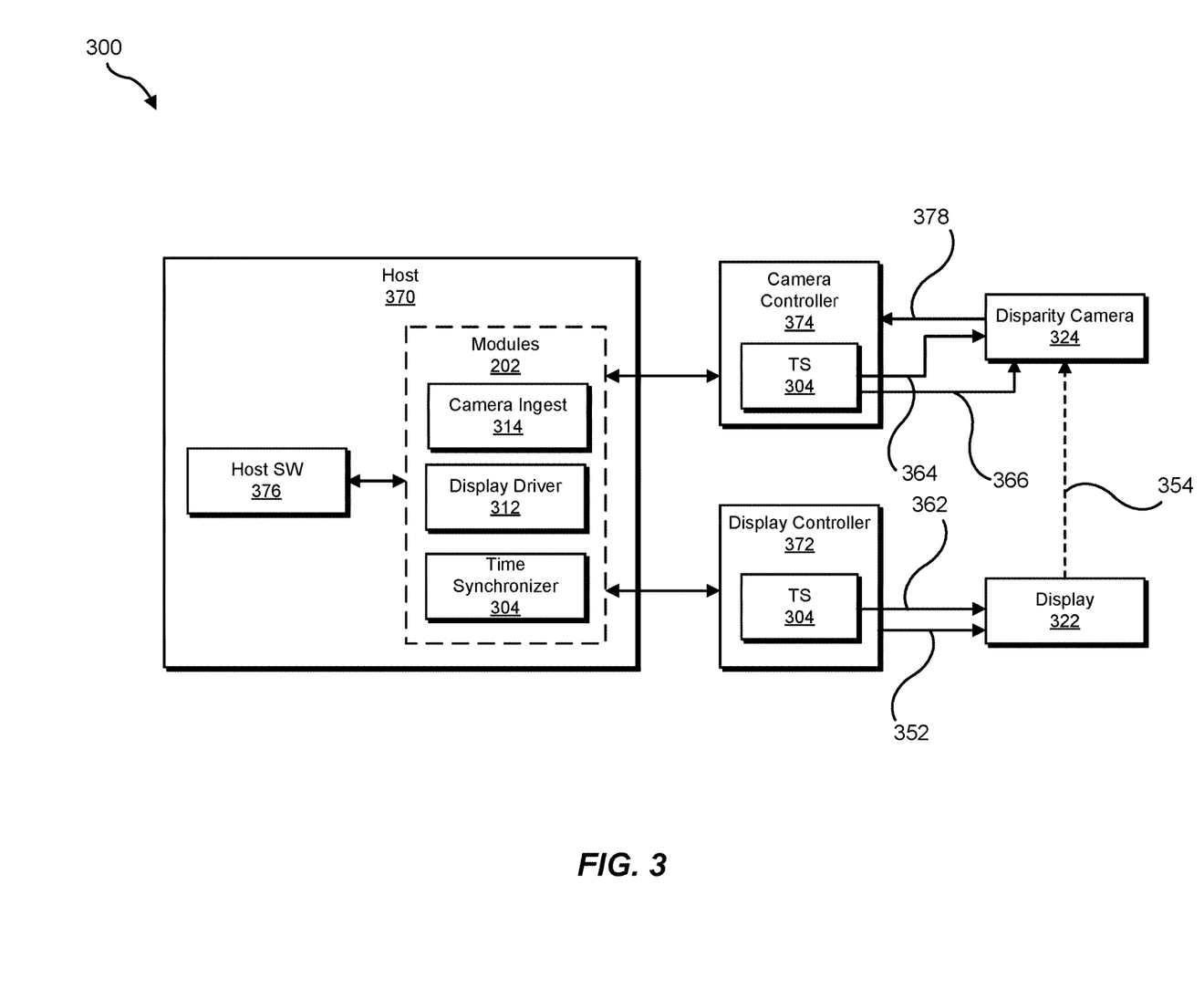
FIG. 3 is a diagram of a device having a rolling display and a disparity camera.

FIG. 3 illustrates system 300 which may include a host 370, a disparity camera 324 (which may correspond to camera 224), and a display 322 (which may correspond to display 222). Host 370 may be a computing device that interfaces with disparity camera 324 via a camera controller 374, and interfaces with display 322 via a display controller 372. Host 370 may include a host software 376 which may correspond to an artificial reality software that interfaces with camera controller 374 and/or display controller 372 via modules 202. Modules 202 may include a camera ingest 314, a display driver 312, and time synchronizer 304. Camera ingest 314 may correspond to software and/or hardware modules for receiving image data from and otherwise interfacing with disparity camera 324. Display driver 312 may correspond to software and/or hardware modules configuring and otherwise interfacing with display 322. Time synchronizer 304 may correspond to software and/or hardware modules for implementing a timing scheme for disparity camera 324 and display 322.

Disparity camera 324 may correspond to an image sensor such as a rolling shutter camera, a global shutter camera, etc. that may be orientated to capture image data from display 322. Camera controller 374 may provide an interface for controlling disparity camera 324 as well as implement TS 304. In some examples, disparity camera 324 may be a rolling shutter camera capable of capturing an image (and/or series of images/frames for video) by scanning across the image rather than the entire image at once. In some examples, disparity camera 324 may be a global shutter camera capable of capturing an entire image in one instance.

Display 322 may correspond to a rolling display, a waveguide, and/or other display such as a microLED display. Display controller 372 may provide an interface for controlling display 322 as well as implement TS 304. In some examples, disparity camera 321 may be a rolling display capable of displaying an image (and/or series of images/frames for video) by displaying across the image rather than the entire image at once.

In some examples, synchronizing disparity camera 324 with display 322 may further include configuring disparity camera 324 and/or display 322 in order to match timing windows for displaying frames (and/or portions thereof) and capturing frames (and/or portions thereof). For example, camera ingest 314 and/or camera controller 374 may set a camera frequency (e.g., frames-per-second) of disparity camera 324 to twice a display frequency of display 322 (which may be set by display driver 312 and/or display controller 372) such that disparity camera 324 may capture frames at twice the rate that display 322 displays frames.

In some examples, camera ingest 314 and/or camera controller 374 may set an exposure of disparity camera 324 to match a display persistence time of display 322 (which may be set by display driver 312 and/or display controller 372). For instance, the exposure of disparity camera 324 may be set to be less than or equal to the display persistence time (e.g., an amount of time that display 322 displays a frame or portion thereof). In some examples, the exposure may be set to be greater than or to exceed the display persistence time. A row-to-row time (e.g., an amount of time between display 322 displaying a row of a frame and a next row of the frame) for display 322 may match a row-to-row time for disparity camera 324 (e.g., an amount of time between disparity camera 324 capturing a row of a frame and a next row of the frame). The row-to-row times may also correspond to a rolling start window (e.g., an amount of time for disparity camera 324 to cycle through every row). For example, the rolling start window may be equal to the row-to-row time multiplied by a number of rows.

Figure 4:
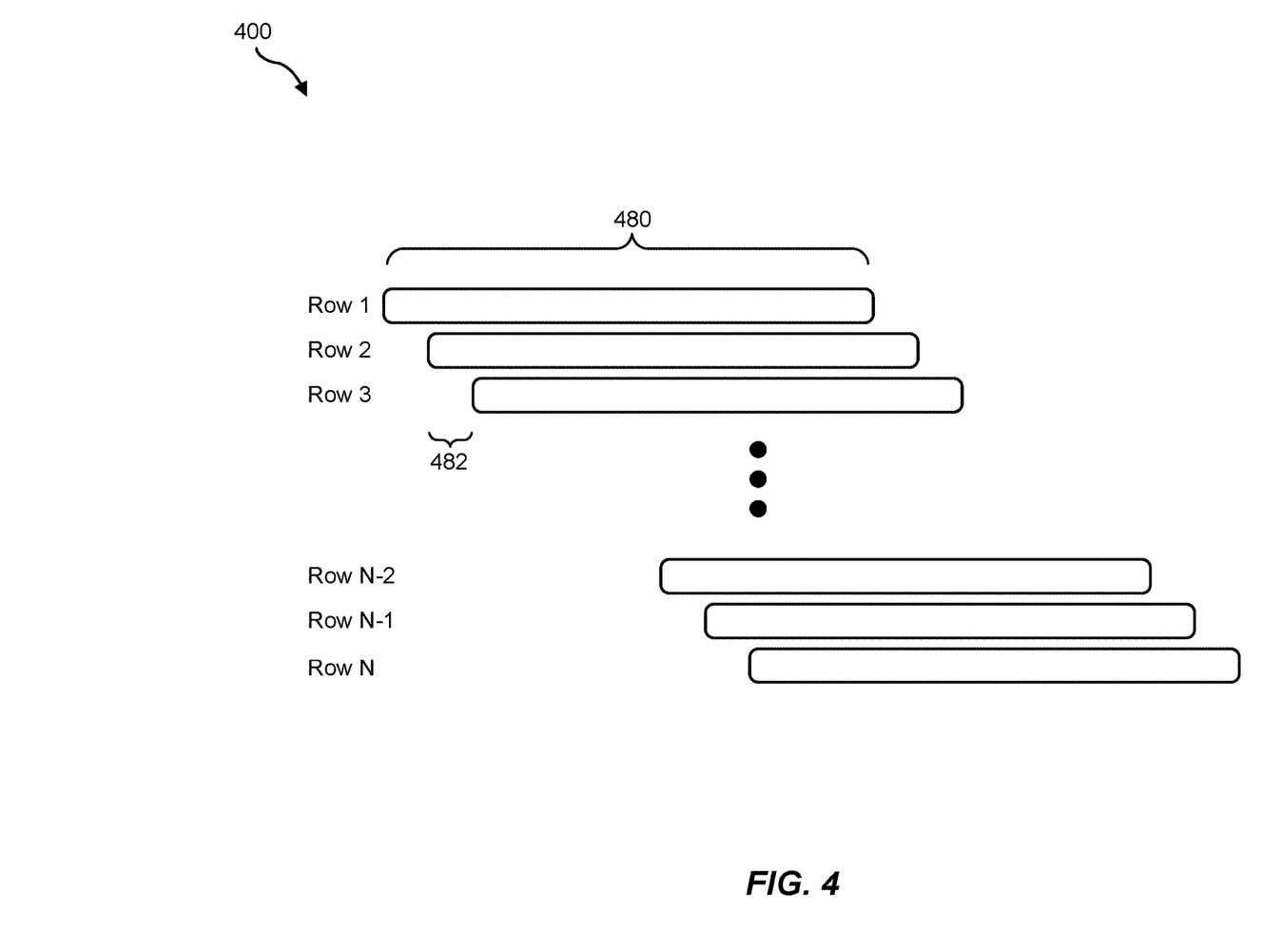
FIG. 4 is a diagram of rows of a frame of content.

FIG. 4 further illustrates a diagram of a frame 400 that may be displayed by a rolling display. Rather than displaying a single full frame at one time, a rolling display may asynchronously display portions of the frame, for example cycling through the portions over time (which may overlap) until the entire frame has been displayed. For example, frame 400 may be divided into rows (e.g., Rows 1-N).

In some embodiments, the term "row" may refer to a portion of a frame (e.g., an image which may be part of a sequence of images for a video). For example, if representing a frame as a matrix of pixel (color) values, a row as used herein may refer to a row and/or column of this matrix. In some examples, a row may refer to a portion of a row and/or column of this matrix, multiple rows and/or columns, or other subsets of this matrix. In some examples, a row may refer to an entire frame (e.g., the entire matrix). In some examples, a row may refer to a portion of a frame as displayed or will be displayed, such as a rendered image and/or may refer directly to the corresponding display area of a display. In some examples, a row may refer to a portion of a frame as will be captured, such as a frame captured by an image sensor and/or may refer directly to the corresponding subset of sensors from the image sensor.

As illustrated in FIG. 4, a display persistence 480 may refer to how long a given row is displayed by a rolling display such as display 322. In FIG. 4, display persistence 480 may be uniform or otherwise consistent for all rows 1-N, although in other examples, display persistence 480 may vary between rows. In addition, FIG. 4 illustrates a row-to-row time 482 corresponding to a time delay between displaying a row and its neighboring row. Although FIG. 4 illustrates a uniform or otherwise consistent row-to-row time 482 between all rows 1-N, in other examples row-to-row time 482 may vary.

A rolling display such as display 322 may therefore display frame 400 as a time-staggered series of rows 1-N. Thus, a camera such as disparity camera 324 may need to synchronize with display 322 to properly capture frame 400. For example, a global shutter camera may need to capture frame 400 at a moment when all of rows 1-N are simultaneously displayed. A rolling shutter camera may capture rows 1-N as they are displayed.

Returning to FIG. 1, at step 104 one or more of the systems described herein may trigger, using a display trigger based on the timing scheme, the display to display a content frame. For example, trigger module 206 may trigger display 222 to display displayed content frame 252.

The systems described herein may perform step 104 in a variety of ways. In one example, display controller 372 may trigger display 322 to display a content frame 352 via a display trigger 362. Display 322 may accordingly display a content frame 352, which may correspond to displayed content frame 252. In some examples, display 322 may display content frame 352 in rows. TS 304 may send (via display controller 372) display trigger 362 to display 322 based on the timing scheme. For example, display trigger 362 may correspond to a modulo value of a timestamp value of the timing scheme. In some examples, the modulo value may be designated for display trigger 362. Additionally, in some examples, display controller 372 may save a display timestamp corresponding to triggering display 322 to display content frame 352. In some examples, the display timestamp may correspond to display trigger 362 (e.g., the timestamp value associated with display trigger 362).

Figure 5:
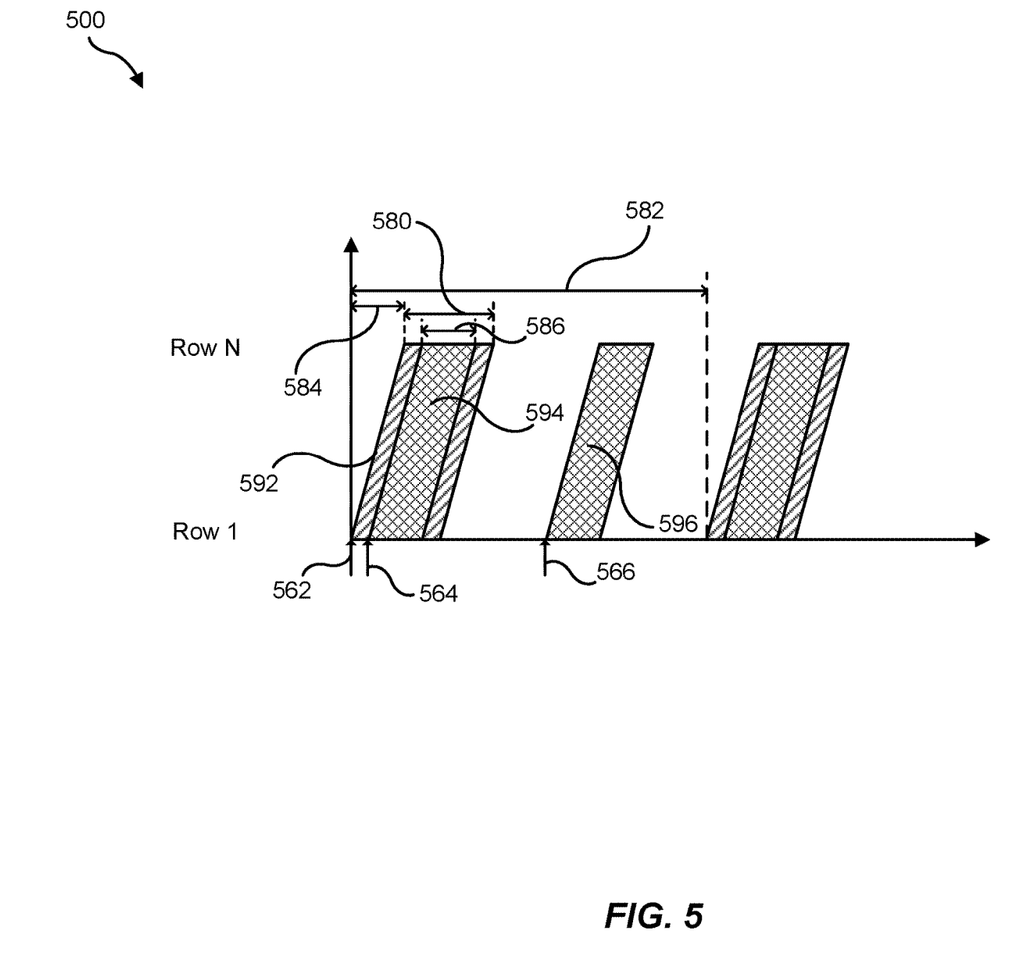
FIG. 5 is a graph of synchronization between a display and a sensor.

FIG. 5 illustrates a timing diagram 500 of displaying and capturing rows (e.g., rows 1-N as in FIG. 4). An x-axis may correspond to time and a y-axis may correspond to rows. A display, such as display 322, may display row 1 in response to a display trigger 562 (which may correspond to display trigger 362). The display may continue to display rows 2-N over time as shown. A rolling start window 584 may correspond to a time lapse between starting the display of row 1 and starting the display of row N. A persistence 580 may correspond to how long a frame or row is displayed. A period 582 may correspond to how often frames are displayed (e.g., a period of 11 ms until a next frame is displayed may correspond to 90 frames-per-second (fps)). A display roll-out 592 (illustrated in FIG. 5 as non-contiguous shaded portions) may correspond to a display time of a frame, and more specifically each of rows 1-N. Display roll-out 592 shows that each of rows 1-N are displayed for an amount of time corresponding to persistence 580, and that row N may stop being displayed at a time approximately equal to a sum of persistence 580 and rolling start window 584 after starting display of row 1.

In addition, although not shown in FIG. 5, in some examples, displaying each of rows 1-N may be triggered by a respective display trigger 562 and corresponding display timestamps may be saved for each row.

Turning back to FIG. 1, at step 106 one or more of the systems described herein may trigger, using a capture trigger based on the timing scheme, the camera to capture the displayed content frame. For example, trigger module 206 may trigger camera 224 to capture captured content frame 254 from display 222 displaying displayed content frame 252.

The systems described herein may perform step 106 in a variety of ways. In one example, camera controller 374 may trigger disparity camera 324 to capture, via a capture trigger 364, captured content frame 354 (which may correspond to captured content frame 254) from display 322. In some examples, disparity camera 324 may capture captured content frame 354 in rows. TS 304 may send (via camera controller 374) capture trigger 364 to disparity camera 324 based on the timing scheme. For example, capture trigger 364 may correspond to a modulo value of a timestamp value of the timing scheme. In some examples, the modulo value may be designated for capture trigger 364, which may be a modulo value selected to be offset from the modulo value of display trigger 362. Additionally, in some examples, camera controller 374 may save a capture timestamp corresponding to triggering disparity camera 324 to capture captured content frame 354. In some examples, the capture timestamp may correspond to capture trigger 364 (e.g., the timestamp value associated with capture trigger 364).

FIG. 5 illustrates a capture trigger 564 which may correspond to capture trigger 364. As shown in FIG. 5, capture trigger 564 may be offset from display trigger 562. A sensor exposure 594 illustrates how a rolling shutter camera, such as disparity camera 324, may capture a frame in rows (e.g., rows 1-N). An exposure 586 may correspond to how long a frame or row is captured by corresponding sensors. Thus, sensor exposure 594 illustrates how the rows of the frame may be captured. Further, as shown in FIG. 5, sensor exposure 594 may not exceed (e.g., extend outside the boundaries of) display roll-out 592 such that the camera is capturing the displayed frame without capturing extraneous image data. The offset of capture trigger 564 and/or exposure 586 may be accordingly selected to ensure that sensor exposure 594 may not exceed display roll-out 592. For example, exposure 586 may be less than persistence 580.

In other examples, based on a type of camera, sensor exposure 594 may have a different shape, such as a rectangle corresponding to a global shutter camera (e.g., by having all rows 1-N captured over the same time period). In such examples, the offset for capture trigger 564 and/or exposure 586 may accordingly be selected to ensure that sensor exposure 594 may not exceed display roll-out 592. In addition, although not shown in FIG. 5, in some examples, capturing each of rows 1-N may be triggered by a respective capture trigger 564 and corresponding capture timestamps may be saved for each row.

Returning now to FIG. 1, in some examples, at step 108 one or more of the systems described herein may trigger, using a background light trigger based on the timing scheme, the camera to capture a background light frame corresponding to no content displayed on the display. For example, trigger module 206 may trigger camera 224 to capture captured background light frame 256 when display 222 is not displaying any content frame.

In some examples, unwanted visual effects in captured content frame 254 may be attributable to noise, such as ambient light and/or other sources of light. To detect background light and distinguish from light from display 222, camera 224 may capture captured background light frame 256 corresponding to background light for when the display is not actively displaying content. In some examples, ambient light may be passively filtered, such as a coating on a lens of camera 224 and/or other filter in front of the lens.

The systems described herein may perform step 108 in a variety of ways. In one example, camera controller 374 may trigger disparity camera 324 to capture, via a background light trigger 366, a captured background light frame (e.g., captured background light frame 256). In some examples, disparity camera 324 may capture the captured background light frame in rows. TS 304 may send (via camera controller 374) background light trigger 366 to disparity camera 324 based on the timing scheme. For example, background light trigger 366 may correspond to a modulo value of a timestamp value of the timing scheme. In some examples, the modulo value may be designated for background light trigger 366, which may be a modulo value selected to be offset from the modulo value of capture trigger 364 and/or display trigger 362. Additionally, in some examples, camera controller 374 may save a background light timestamp corresponding to triggering disparity camera 324 to capture the captured background light frame. In some examples, the background light timestamp may correspond to background light trigger 366 (e.g., the timestamp value associated with background light trigger 366).

FIG. 5 illustrates a background light trigger 566 which may correspond to background light trigger 366. As shown in FIG. 5, background light trigger 566 may be offset from capture trigger 564. A sensor exposure 596 illustrates how the rolling shutter camera (e.g., disparity camera 324), may capture a frame in rows (e.g., rows 1-N). Settings for sensor exposure 596 may be similar to that of sensor exposure 594 as reflected by their similar shapes. Thus, sensor exposure 596 illustrates how the rows of the background light frame may be captured (e.g. outside of display roll-out 592). The offset of background light trigger 566 may be accordingly selected to ensure that sensor exposure 596 may not overlap display roll-out 592. The offset may be based on, for example, half of period 582 or other appropriate value corresponding to when the display is not actively displaying a content frame. Additionally, although FIG. 5 illustrates background light trigger 566 occurring after the display finishes displaying the corresponding content frame, in some examples background light trigger 566 may occur before the display begins displaying the corresponding content frame.

In addition, although not shown in FIG. 5, in some examples, capturing background light for each of rows 1-N may be triggered by a respective background light trigger 566 and corresponding background light timestamps may be saved for each row.

At step 110 one or more of the systems described herein may build a timeline of frame events for the displayed content frame, the captured content frame, and in some examples, the captured background light frame. For example, build module 208 may build timeline 250 including displayed content frame 252, captured content frame 254, and if available, captured background light frame 256.

The systems described herein may perform step 110 in a variety of ways. In one example, build module 208 may receive displayed content frame 252, captured content frame 254, and/or captured background light frame 256 along with their respective timestamps (e.g., the display timestamp, the capture timestamp, and the background light timestamp as described above). For example, camera controller 374 may send captured frames 378, which may include captured content frame 354 and a captured background light frame, to camera ingest 314 along with the capture timestamp and the background light timestamp. Display controller 372 may send the display timestamp to host 370 to allow host 370 to build the timeline of frame events.

In some examples, build module 208 may comprise a state machine such that building timeline 250 may include inputting the display timestamp, the capture timestamp, and the background timestamp into the state machine.

In some examples, timeline 250 may be more granular than frames and may instead or in addition include a timeline of row events. For example, each row may have a display timestamp, capture timestamp, and background light timestamp such that timeline 250 may organize timestamps based on row.

At step 112 one or more of the systems described herein may match, using the timeline of frame events, the displayed content frame with the captured content frame and in some examples the captured background light frame. For example, match module 210 may match displayed content frame 252 with captured content frame 254 and (if available) captured background light frame 256 using timeline 250.

The systems described herein may perform step 112 in a variety of ways. In one example, match module 210 may match displayed content frame 252 to captured content frame 254 that has its capture timestamp offset from the display timestamp by the expected offset between the display timestamp and the capture timestamp (which may correspond to respective modulo values). Similarly, match module 210 may match captured background light frame 256 to captured content frame 254 (and/or displayed content frame 252) based on its background light timestamp being offset by the expected offset between the background light timestamp and the capture timestamp (and/or display timestamp), which in some examples may be based on respective modulo values.

In some examples, build module 208 may create timeline 250 by matching corresponding displayed content frame 252, captured content frame 254, and/or captured background light frame 256 such that match module 210 may rely on the organization and/or sequence of frame events to match frames. In addition, in some examples, match module 210 may match rows (e.g., corresponding rows from displayed content frame 252, captured content frame 254, and captured background light frame 256).

The systems and methods described herein may relate to an artificial reality system, such as an augmented reality system having compact displays placed on the temples of eyeglasses to project images on the displays (e.g., glasses and/or waveguides). The size of a user's head or their body movement may change the angle of the display with respect to the glasses/waveguides. This changed angle may distort the projected frames and cause misalignments which include relative tip, tilt, and clocking, as well as other visual defects, such as illumination and/or color mismatch or non-uniformity. In order to dynamically fix this misalignment/distortion, a camera may capture the frames and correct the frames at the display source, such that the final frame on the glass may be undistorted. However, the camera and the display may need to be time-synchronized and their row/frame times may need to match closely.

In some examples, the camera and display controllers may not share any hardware synchronization signals. Thus, the camera and display may be synchronized using a PTP-based time synchronization scheme.

Display illumination and camera capture may be triggered based on a modulo value of the PTP synchronized timestamp. Also, the camera and the display may be triggered with an offset, such that the rolling window of the camera is synchronized to the region of interest on the rolling display.

Additionally, a display row persistence and a row-to-row time may be adjusted such that the camera row time may be closely matched. Similarly, the exposure of the camera may be minimized to reduce and/or minimize captured background light.

Display illumination trigger and camera capture trigger events may be timestamped in hardware (as synchronized using PTP) and fed into a state machine in software in order to build a timeline of display/capture events.

Thus, as described herein, the display and camera drivers may be time-synchronized using a time synchronization mechanism such as PTP. A display frequency (fps) and a camera frequency may be set to 1× and 2×, respectively, such that the camera can capture one frame of content with minimal background light, and another frame of background light only. Background light capture may be used for undistorting images. A display persistence and a row-to-row time may be set such that the timing envelope of the rolling display and rolling shutter camera match. A camera exposure may be minimized or set to match the total display frame time such that the background light is reduced/minimal for the content capture. A host may then receive the display and camera trigger timestamps, which it may use to build a timeline of events. This may allow matching the displayed content to the captured content for undistorting images.

EXAMPLE EMBODIMENTS

Example 1: A computer-implemented method for synchronizing a disparity camera may include: synchronizing a timing scheme between a display and a camera; triggering, using a display trigger based on the timing scheme, the display to display a content frame; triggering, using a capture trigger based on the timing scheme, the camera to capture the displayed content frame; building a timeline of frame events for the displayed content frame and the captured content frame; and matching, using the timeline of frame events, the displayed content frame with the captured content frame.

Example 2: The method of Example 1, further comprising triggering, using a background light trigger based on the timing scheme, the camera to capture a background light frame corresponding to no content displayed on the display, wherein building the timeline of frame events further comprises building the timeline of frame events with the captured background light frame and matching the displayed content frame with the captured content frame further comprises matching the displayed content frame with the captured background light frame based on the timeline of frame events.

Example 3: The method of Example 2, further comprising: saving a display timestamp corresponding to triggering the display to display the content frame; saving a capture timestamp corresponding to triggering the camera to capture the displayed content frame; and saving a background light timestamp corresponding to triggering the camera to capture the background light frame.

Example 4: The method of Example 3, wherein the display timestamp corresponds to the display trigger, the capture timestamp corresponds to the capture trigger, and the background light timestamp corresponds to the background light trigger.

Example 5: The method of Example 3 or 4, wherein the display trigger, the capture trigger, and the background light trigger are each based on a respective modulo value of a timestamp value of the timing scheme.

Example 6: The method of Example 3, 4, or 5, wherein the capture trigger is offset from the display trigger.

Example 7: The method of any of Examples 3-6, wherein the background light trigger is offset from the capture trigger.

Example 8: The method of any of Examples 3-7, wherein building the timeline of frame events further comprises inputting the display timestamp, the capture timestamp, and the background light timestamp into a state machine.

Example 9: The method of any of Examples 1-8, further comprising setting a camera frequency of the camera to twice a display frequency of the display.

Example 10: The method of any of Examples 1-9, further comprising setting an exposure of the camera to match a display persistence time.

Example 11: The method of any of Examples 1-10, wherein the timing scheme corresponds to a time synchronization protocol.

Example 12: The method of any of Examples 1-11, wherein the display corresponds to a rolling display.

Example 13: The method of any of Examples 1-12, wherein the camera corresponds to a rolling shutter camera.

Example 14: The method of any of Examples 1-13, wherein the camera corresponds to a global shutter camera.

Example 15: A system comprising: at least one physical processor; a camera; a display; and physical memory comprising computer-executable instructions that, when executed by the physical processor, cause the physical processor to: synchronize a timing scheme between the display and the camera; trigger, using a display trigger based on the timing scheme, the display to display a content frame; trigger, using a capture trigger based on the timing scheme, the camera to capture the displayed content frame; build a timeline of frame events for the displayed content frame and the captured content frame; and match, using the timeline of frame events, the displayed content frame with the captured content frame.

Example 16: The system of Example 15, wherein the instructions further comprise instructions for: triggering, using a background light trigger based on the timing scheme, the camera to capture a background light frame corresponding to no content displayed on the display, wherein building the timeline of frame events further comprises building the timeline of frame events with the captured background light frame and matching the displayed content frame with the captured content frame further comprises matching the displayed content frame with the captured background light frame based on the timeline of frame events; saving a display timestamp corresponding to triggering the display to display the content frame; saving a capture timestamp corresponding to triggering the camera to capture the displayed content frame; and saving a background light timestamp corresponding to triggering the camera to capture the background light frame.

Example 17: The system of Example 16, wherein: the display timestamp corresponds to the display trigger, the capture timestamp corresponds to the capture trigger; the background light timestamp corresponds to the background light trigger; the capture trigger is offset from the display trigger; the background light trigger is offset from the capture trigger; and the display trigger, the capture trigger, and the background light trigger are each based on a respective modulo value of a timestamp value of the timing scheme.

Example 18: A non-transitory computer-readable medium comprising one or more computer-executable instructions that, when executed by at least one processor of a computing device, cause the computing device to: synchronize a timing scheme between a display and a camera; trigger, using a display trigger based on the timing scheme, the display to display a content frame; trigger, using a capture trigger based on the timing scheme, the camera to capture the displayed content frame; build a timeline of frame events for the displayed content frame and the captured content frame; and match, using the timeline of frame events, the displayed content frame with the captured content frame.

Example 19: The non-transitory computer-readable medium of Example 18, wherein the instructions further comprise instructions for: triggering, using a background light trigger based on the timing scheme, the camera to capture a background light frame corresponding to no content displayed on the display, wherein building the timeline of frame events further comprises building the timeline of frame events with the captured background light frame and matching the displayed content frame with the captured content frame further comprises matching the displayed content frame with the captured background light frame based on the timeline of frame events; saving a display timestamp corresponding to triggering the display to display the content frame; saving a capture timestamp corresponding to triggering the camera to capture the displayed content frame; and saving a background light timestamp corresponding to triggering the camera to capture the background light frame.

Example 20: The non-transitory computer-readable medium of Example 19, wherein: the display timestamp corresponds to the display trigger, the capture timestamp corresponds to the capture trigger; the background light timestamp corresponds to the background light trigger; the capture trigger is offset from the display trigger; the background light trigger is offset from the capture trigger; and the display trigger, the capture trigger, and the background light trigger are each based on a respective modulo value of a timestamp value of the timing scheme.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 600 in FIG. 6) or that visually immerses a user in an artificial reality (such as, e.g., virtual-reality system 700 in FIG. 7). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 6:
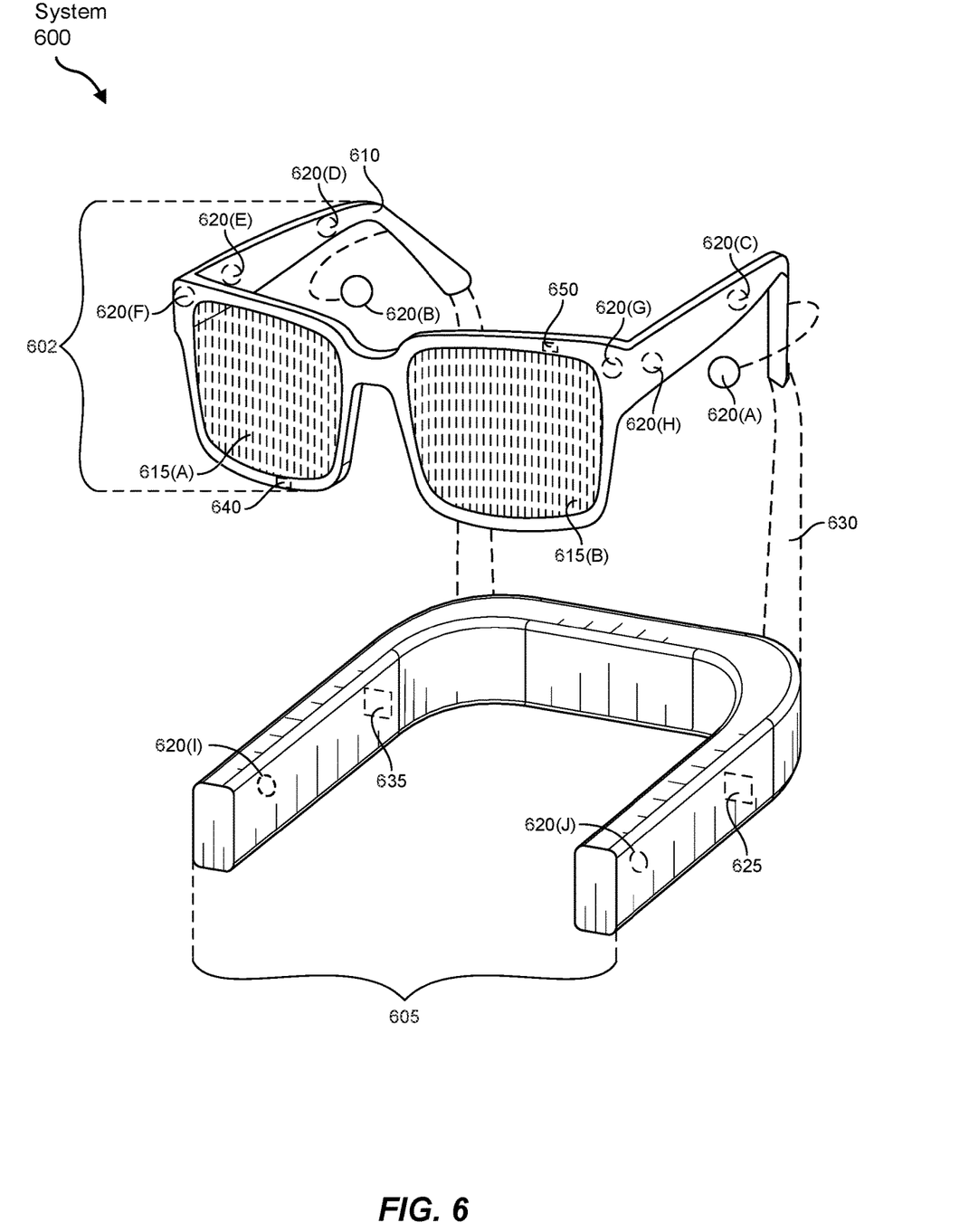
FIG. 6 is an illustration of exemplary augmented-reality glasses that may be used in connection with embodiments of this disclosure.

Turning to FIG. 6, augmented-reality system 600 may include an eyewear device 602 with a frame 610 configured to hold a left display device 615(A) and a right display device 615(B) in front of a user's eyes. Display devices 615(A) and 615(B) may act together or independently to present an image or series of images to a user. While augmented-reality system 600 includes two displays, embodiments of this disclosure may be implemented in augmented-reality systems with a single NED or more than two NEDs.

In some embodiments, augmented-reality system 600 may include one or more sensors, such as sensor 640. Sensor 640 may generate measurement signals in response to motion of augmented-reality system 600 and may be located on substantially any portion of frame 610. Sensor 640 may represent one or more of a variety of different sensing mechanisms, such as a position sensor, an inertial measurement unit (IMU), a depth camera assembly, a structured light emitter and/or detector, or any combination thereof. In some embodiments, augmented-reality system 600 may or may not include sensor 640 or may include more than one sensor. In embodiments in which sensor 640 includes an IMU, the IMU may generate calibration data based on measurement signals from sensor 640. Examples of sensor 640 may include, without limitation, accelerometers, gyroscopes, magnetometers, other suitable types of sensors that detect motion, sensors used for error correction of the IMU, or some combination thereof.

In some examples, augmented-reality system 600 may also include a microphone array with a plurality of acoustic transducers 620(A)-620(J), referred to collectively as acoustic transducers 620. Acoustic transducers 620 may represent transducers that detect air pressure variations induced by sound waves. Each acoustic transducer 620 may be configured to detect sound and convert the detected sound into an electronic format (e.g., an analog or digital format). The microphone array in FIG. 6 may include, for example, ten acoustic transducers: 620(A) and 620(B), which may be designed to be placed inside a corresponding ear of the user, acoustic transducers 620(C), 620(D), 620(E), 620(F), 620 (G), and 620(H), which may be positioned at various locations on frame 610, and/or acoustic transducers 620(I) and 620(J), which may be positioned on a corresponding neckband 605.

In some embodiments, one or more of acoustic transducers 620(A)-(J) may be used as output transducers (e.g., speakers). For example, acoustic transducers 620(A) and/or 620(B) may be earbuds or any other suitable type of headphone or speaker.

The configuration of acoustic transducers 620 of the microphone array may vary. While augmented-reality system 600 is shown in FIG. 6 as having ten acoustic transducers 620, the number of acoustic transducers 620 may be greater or less than ten. In some embodiments, using higher numbers of acoustic transducers 620 may increase the amount of audio information collected and/or the sensitivity and accuracy of the audio information. In contrast, using a lower number of acoustic transducers 620 may decrease the computing power required by an associated controller 650 to process the collected audio information. In addition, the position of each acoustic transducer 620 of the microphone array may vary. For example, the position of an acoustic transducer 620 may include a defined position on the user, a defined coordinate on frame 610, an orientation associated with each acoustic transducer 620, or some combination thereof.

Acoustic transducers 620(A) and 620(B) may be positioned on different parts of the user's ear, such as behind the pinna, behind the tragus, and/or within the auricle or fossa. Or, there may be additional acoustic transducers 620 on or surrounding the ear in addition to acoustic transducers 620 inside the ear canal. Having an acoustic transducer 620 positioned next to an ear canal of a user may enable the microphone array to collect information on how sounds arrive at the ear canal. By positioning at least two of acoustic transducers 620 on either side of a user's head (e.g., as binaural microphones), augmented-reality device 600 may simulate binaural hearing and capture a 3D stereo sound field around about a user's head. In some embodiments, acoustic transducers 620(A) and 620(B) may be connected to augmented-reality system 600 via a wired connection 630, and in other embodiments acoustic transducers 620(A) and 620(B) may be connected to augmented-reality system 600 via a wireless connection (e.g., a BLUETOOTH connection). In still other embodiments, acoustic transducers 620(A) and 620(B) may not be used at all in conjunction with augmented-reality system 600.

Acoustic transducers 620 on frame 610 may be positioned in a variety of different ways, including along the length of the temples, across the bridge, above or below display devices 615(A) and 615(B), or some combination thereof. Acoustic transducers 620 may also be oriented such that the microphone array is able to detect sounds in a wide range of directions surrounding the user wearing the augmented-reality system 600. In some embodiments, an optimization process may be performed during manufacturing of augmented-reality system 600 to determine relative positioning of each acoustic transducer 620 in the microphone array.

In some examples, augmented-reality system 600 may include or be connected to an external device (e.g., a paired device), such as neckband 605. Neckband 605 generally represents any type or form of paired device. Thus, the following discussion of neckband 605 may also apply to various other paired devices, such as charging cases, smart watches, smart phones, wrist bands, other wearable devices, hand-held controllers, tablet computers, laptop computers, other external compute devices, etc.

As shown, neckband 605 may be coupled to eyewear device 602 via one or more connectors. The connectors may be wired or wireless and may include electrical and/or non-electrical (e.g., structural) components. In some cases, eyewear device 602 and neckband 605 may operate independently without any wired or wireless connection between them. While FIG. 6 illustrates the components of eyewear device 602 and neckband 605 in example locations on eyewear device 602 and neckband 605, the components may be located elsewhere and/or distributed differently on eyewear device 602 and/or neckband 605. In some embodiments, the components of eyewear device 602 and neckband 605 may be located on one or more additional peripheral devices paired with eyewear device 602, neckband 605, or some combination thereof.

Pairing external devices, such as neckband 605, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 600 may be provided by a paired device or shared between a paired device and an eyewear device, thus reducing the weight, heat profile, and form factor of the eyewear device overall while still retaining desired functionality. For example, neckband 605 may allow components that would otherwise be included on an eyewear device to be included in neckband 605 since users may tolerate a heavier weight load on their shoulders than they would tolerate on their heads. Neckband 605 may also have a larger surface area over which to diffuse and disperse heat to the ambient environment. Thus, neckband 605 may allow for greater battery and computation capacity than might otherwise have been possible on a stand-alone eyewear device. Since weight carried in neckband 605 may be less invasive to a user than weight carried in eyewear device 602, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 605 may be communicatively coupled with eyewear device 602 and/or to other devices. These other devices may provide certain functions (e.g., tracking, localizing, depth mapping, processing, storage, etc.) to augmented-reality system 600. In the embodiment of FIG. 6, neckband 605 may include two acoustic transducers (e.g., 620(1) and 620(J)) that are part of the microphone array (or potentially form their own microphone subarray). Neckband 605 may also include a controller 625 and a power source 635.

Acoustic transducers 620(I) and 620(J) of neckband 605 may be configured to detect sound and convert the detected sound into an electronic format (analog or digital). In the embodiment of FIG. 6, acoustic transducers 620(I) and 620(J) may be positioned on neckband 605, thereby increasing the distance between the neckband acoustic transducers 620(I) and 620(J) and other acoustic transducers 620 positioned on eyewear device 602. In some cases, increasing the distance between acoustic transducers 620 of the microphone array may improve the accuracy of beamforming performed via the microphone array. For example, if a sound is detected by acoustic transducers 620(C) and 620(D) and the distance between acoustic transducers 620(C) and 620(D) is greater than, e.g., the distance between acoustic transducers 620(D) and 620(E), the determined source location of the detected sound may be more accurate than if the sound had been detected by acoustic transducers 620(D) and 620(E).

Controller 625 of neckband 605 may process information generated by the sensors on neckband 605 and/or augmented-reality system 600. For example, controller 625 may process information from the microphone array that describes sounds detected by the microphone array. For each detected sound, controller 625 may perform a direction-of-arrival (DOA) estimation to estimate a direction from which the detected sound arrived at the microphone array. As the microphone array detects sounds, controller 625 may populate an audio data set with the information. In embodiments in which augmented-reality system 600 includes an inertial measurement unit, controller 625 may compute all inertial and spatial calculations from the IMU located on eyewear device 602. A connector may convey information between augmented-reality system 600 and neckband 605 and between augmented-reality system 600 and controller 625. The information may be in the form of optical data, electrical data, wireless data, or any other transmittable data form. Moving the processing of information generated by augmented-reality system 600 to neckband 605 may reduce weight and heat in eyewear device 602, making it more comfortable to the user.

Power source 635 in neckband 605 may provide power to eyewear device 602 and/or to neckband 605. Power source 635 may include, without limitation, lithium ion batteries, lithium-polymer batteries, primary lithium batteries, alkaline batteries, or any other form of power storage. In some cases, power source 635 may be a wired power source. Including power source 635 on neckband 605 instead of on eyewear device 602 may help better distribute the weight and heat generated by power source 635.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 700 in FIG. 7, that mostly or completely covers a user's field of view. Virtual-reality system 700 may include a front rigid body 702 and a band 704 shaped to fit around a user's head. Virtual-reality system 700 may also include output audio transducers 706(A) and 706(B). Furthermore, while not shown in FIG. 7, front rigid body 702 may include one or more electronic elements, including one or more electronic displays, one or more inertial measurement units (IMUs), one or more tracking emitters or detectors, and/or any other suitable device or system for creating an artificial-reality experience.

Figure 7:
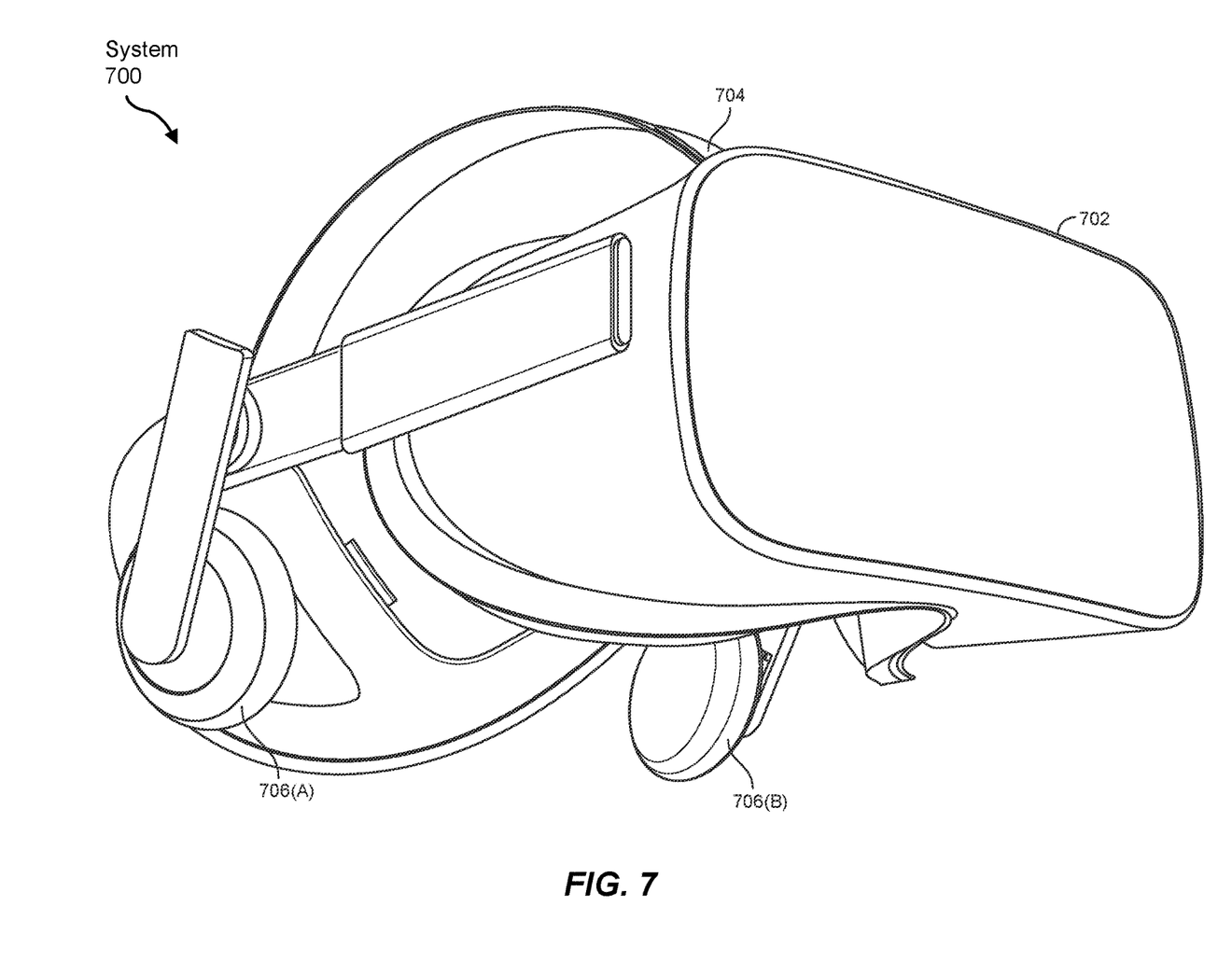
FIG. 7 is an illustration of an exemplary virtual-reality headset that may be used in connection with embodiments of this disclosure.

Artificial-reality systems may include a variety of types of visual feedback mechanisms. For example, display devices in augmented-reality system 600 and/or virtual-reality system 700 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 600 and/or virtual-reality system 700 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 600 and/or virtual-reality system 700 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive image and timestamp data to be transformed, transform the image and timestamp data, use the result of the transformation to build a timeline of frame events, and store the result of the transformation to match frame events. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
synchronizing a timing scheme between a display and a camera;
triggering, using a display trigger based on the timing scheme, the display to display a content frame;
triggering, using a capture trigger based on the timing scheme, the camera to capture the displayed content frame;
building a timeline of frame events for the displayed content frame and the captured content frame; and
matching, using the timeline of frame events, the displayed content frame with the captured content frame.

2. The method of claim 1, further comprising triggering, using a background light trigger based on the timing scheme, the camera to capture a background light frame corresponding to no content displayed on the display, wherein building the timeline of frame events further comprises building the timeline of frame events with the captured background light frame and matching the displayed content frame with the captured content frame further comprises matching the displayed content frame with the captured background light frame based on the timeline of frame events.

3. The method of claim 2, further comprising:
saving a display timestamp corresponding to triggering the display to display the content frame;
saving a capture timestamp corresponding to triggering the camera to capture the displayed content frame; and
saving a background light timestamp corresponding to triggering the camera to capture the background light frame.

4. The method of claim 3, wherein the display timestamp corresponds to the display trigger, the capture timestamp corresponds to the capture trigger, and the background light timestamp corresponds to the background light trigger.

5. The method of claim 3, wherein the display trigger, the capture trigger, and the background light trigger are each based on a respective modulo value of a timestamp value of the timing scheme.

6. The method of claim 3, wherein the capture trigger is offset from the display trigger.

7. The method of claim 3, wherein the background light trigger is offset from the capture trigger.

8. The method of claim 3, wherein building the timeline of frame events further comprises inputting the display timestamp, the capture timestamp, and the background light timestamp into a state machine.

9. The method of claim 1, further comprising setting a camera frequency of the camera to twice a display frequency of the display.

10. The method of claim 1, further comprising setting an exposure of the camera to match a display persistence time.

11. The method of claim 1, wherein the timing scheme corresponds to a time synchronization protocol.

12. The method of claim 1, wherein the display corresponds to a rolling display.

13. The method of claim 1, wherein the camera corresponds to a rolling shutter camera.

14. The method of claim 1, wherein the camera corresponds to a global shutter camera.

15. A system comprising:
at least one physical processor;
a camera;
a display; and
physical memory comprising computer-executable instructions that, when executed by the physical processor, cause the physical processor to:
synchronize a timing scheme between the display and the camera;
trigger, using a display trigger based on the timing scheme, the display to display a content frame;
trigger, using a capture trigger based on the timing scheme, the camera to capture the displayed content frame;
build a timeline of frame events for the displayed content frame and the captured content frame; and
match, using the timeline of frame events, the displayed content frame with the captured content frame.

16. The system of claim 15, wherein the instructions further comprise instructions for:
triggering, using a background light trigger based on the timing scheme, the camera to capture a background light frame corresponding to no content displayed on the display, wherein building the timeline of frame events further comprises building the timeline of frame events with the captured background light frame and matching the displayed content frame with the captured content frame further comprises matching the displayed content frame with the captured background light frame based on the timeline of frame events;
saving a display timestamp corresponding to triggering the display to display the content frame;
saving a capture timestamp corresponding to triggering the camera to capture the displayed content frame; and
saving a background light timestamp corresponding to triggering the camera to capture the background light frame.

17. The system of claim 16, wherein:
the display timestamp corresponds to the display trigger, the capture timestamp corresponds to the capture trigger;
the background light timestamp corresponds to the background light trigger;
the capture trigger is offset from the display trigger;
the background light trigger is offset from the capture trigger; and
the display trigger, the capture trigger, and the background light trigger are each based on a respective modulo value of a timestamp value of the timing scheme.

18. A non-transitory computer-readable medium comprising one or more computer-executable instructions that, when executed by at least one processor of a computing device, cause the computing device to:
synchronize a timing scheme between a display and a camera;
trigger, using a display trigger based on the timing scheme, the display to display a content frame;
trigger, using a capture trigger based on the timing scheme, the camera to capture the displayed content frame;
build a timeline of frame events for the displayed content frame and the captured content frame; and
match, using the timeline of frame events, the displayed content frame with the captured content frame.

19. The non-transitory computer-readable medium of claim 18, wherein the instructions further comprise instructions for:
triggering, using a background light trigger based on the timing scheme, the camera to capture a background light frame corresponding to no content displayed on the display, wherein building the timeline of frame events further comprises building the timeline of frame events with the captured background light frame and matching the displayed content frame with the captured content frame further comprises matching the displayed content frame with the captured background light frame based on the timeline of frame events;
saving a display timestamp corresponding to triggering the display to display the content frame;
saving a capture timestamp corresponding to triggering the camera to capture the displayed content frame; and
saving a background light timestamp corresponding to triggering the camera to capture the background light frame.

20. The non-transitory computer-readable medium of claim 19, wherein:
the display timestamp corresponds to the display trigger, the capture timestamp corresponds to the capture trigger;
the background light timestamp corresponds to the background light trigger;
the capture trigger is offset from the display trigger;
the background light trigger is offset from the capture trigger; and the display trigger, the capture trigger, and the background light trigger are each based on a respective modulo value of a timestamp value of the timing scheme.

\* \* \* \* \*